(12) United States Patent    (10) Patent No.: US 6,712,485 B2
Matthews    (45) Date of Patent: Mar. 30, 2004

(54) FLASHLIGHT SECUREMENT SYSTEMS

(75) Inventor: John W. Matthews, Newport Beach, CA (US)

(73) Assignee: Surefire, LLC, Fountain Valley, CA (US)

( * ) Notice: Subject to any disclaimer, the term of this patent is extended or adjusted under 35 U.S.C. 154(b) by 0 days.

(21) Appl. No.: 10/159,359

(22) Filed: May 29, 2002

(65) Prior Publication Data

US 2002/0154500 A1 Oct. 24, 2002

Related U.S. Application Data

(63) Continuation-in-part of application No. 09/606,605, filed on Jun. 29, 2000.

(51) Int. Cl.[7] .................................................. F21L 4/00
(52) U.S. Cl. ..................... 362/191; 362/396; 362/474; 362/190
(58) Field of Search ................................ 362/190, 191, 362/103, 118, 396, 474

(56) References Cited

U.S. PATENT DOCUMENTS

| | | |
|---|---|---|
| 1,279,186 A | 9/1918 | Wahl |
| 2,134,856 A | 11/1938 | Burgess |
| 2,385,640 A | 9/1945 | Packer et al. |
| 2,470,421 A | 5/1949 | Woody |
| 3,711,703 A | 1/1973 | Bacevius |
| 4,484,253 A | 11/1984 | Roberts |
| 4,495,551 A | 1/1985 | Foltz |
| 4,517,628 A | 5/1985 | McDermott |
| 4,563,728 A * | 1/1986 | Bruggeman et al. ........ 362/118 |
| 5,025,966 A | 6/1991 | Potter |
| 5,144,546 A | 9/1992 | Burdi |
| 5,570,965 A | 11/1996 | Coolen |
| 5,630,535 A | 5/1997 | Valenti |
| 5,660,363 A | 8/1997 | Maglica |
| 5,816,684 A | 10/1998 | Yu |

* cited by examiner

*Primary Examiner*—Sandra O'Shea
*Assistant Examiner*—Bao Q Truong
(74) *Attorney, Agent, or Firm*—David Weiss

(57) ABSTRACT

Apparatus and methods directed to a hand holdable flashlight including a battery housing having an undercut groove to which is removably fitted a head of an interface device which itself is removably securable to the object.

36 Claims, 4 Drawing Sheets

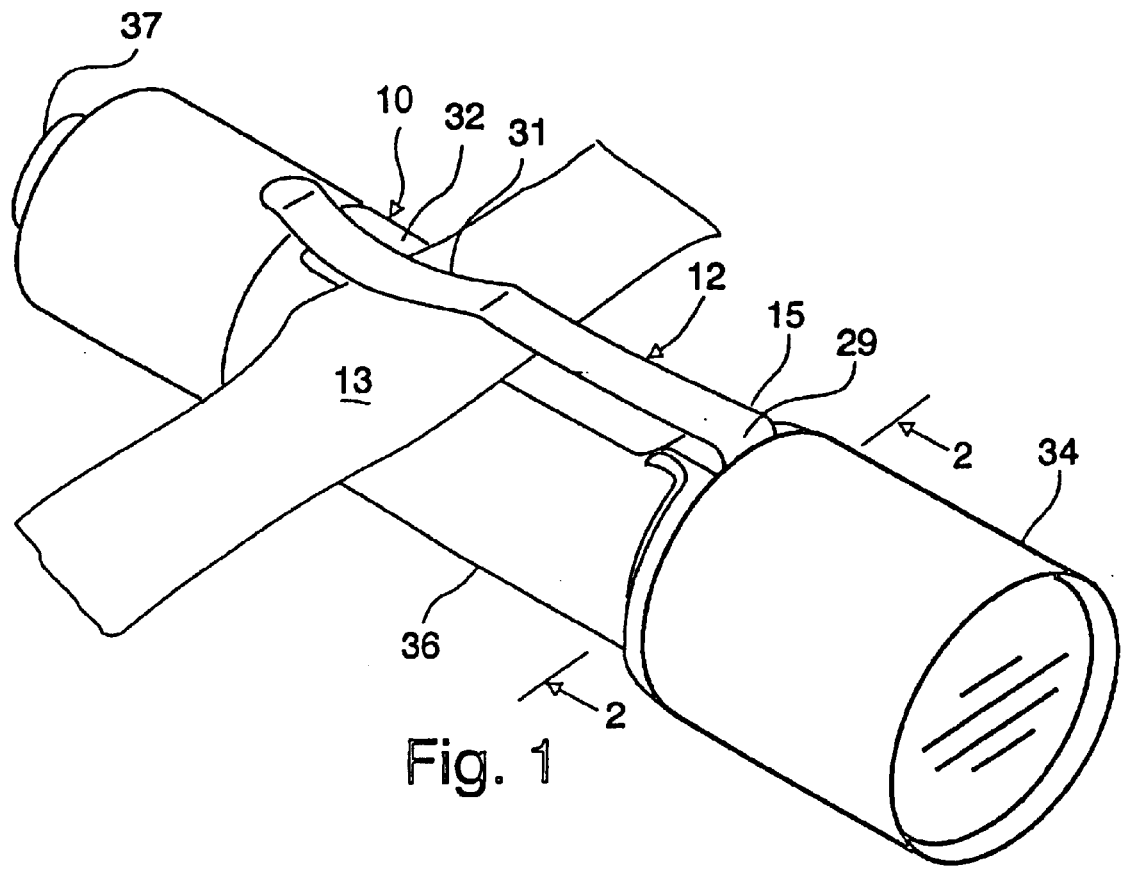
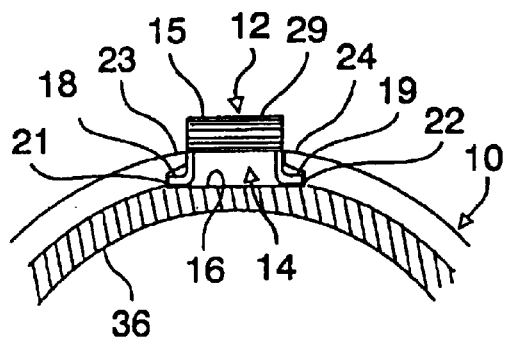

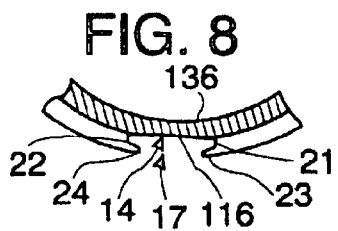
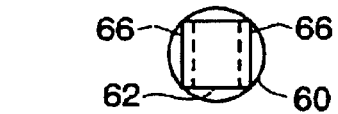
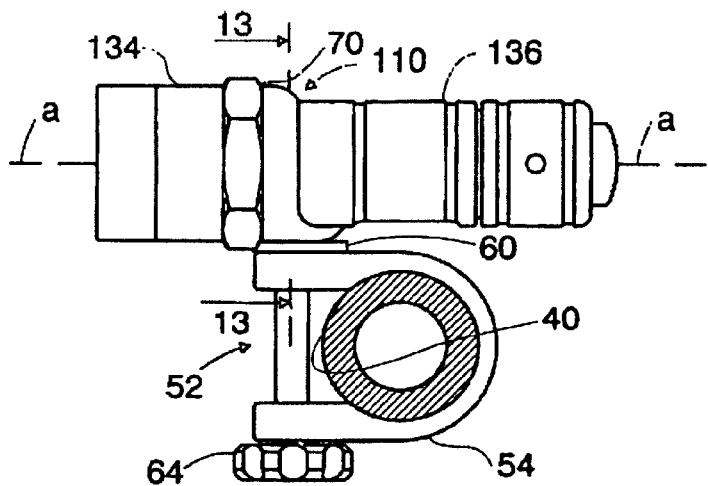
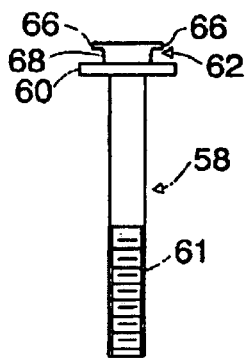
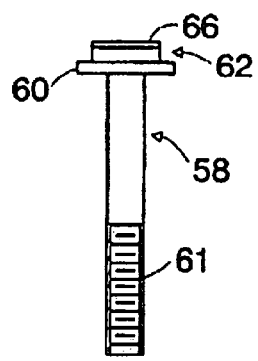
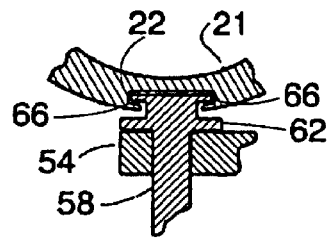
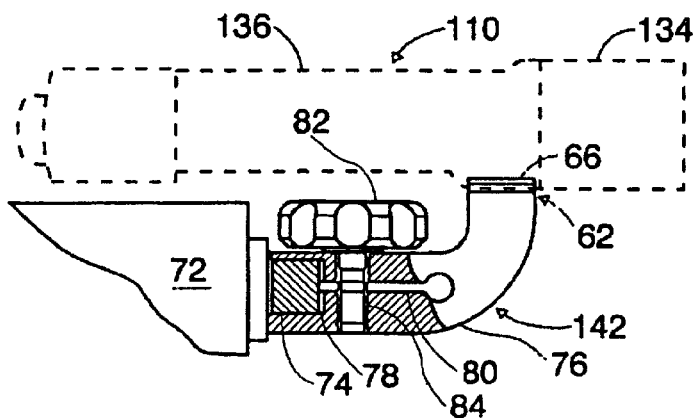
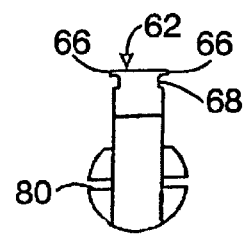

FLASHLIGHT SECUREMENT SYSTEMS

CROSS REFERENCE TO RELATED APPLICATION

This application is a continuation-in-part of co-pending U.S. patent application Ser. No. 09/606,605, filed Jun. 29, 2000, incorporated herein by reference.

BACKGROUND OF THE INVENTION

This invention relates to flashlight securement systems, and more particularly to flashlight apparatus removably securable to an object and methods for effecting such securement.

The aforementioned parent application Ser. No. 09/606,605 discloses apparatus and methods for equipping a portable device, such as a flashlight, with a clip for attachment to an object. From one aspect thereof, that invention resides in a method of equipping a portable device with a clip for attachment thereof to an object. That aspect of the invention more specifically resides in the combination of providing such device with an undercut groove, providing the clip with a head fitting into that undercut groove, and attaching that clip to the portable device by fitting that head of the clip into that undercut groove. From a related aspect thereof, the invention resides in a portable device, comprising, in combination, an undercut groove, and a device attachment clip having a head fit into that undercut groove. The invention resides also in a clip for attachment of a portable device to an object, comprising, in combination, a bent over end portion, and lateral protrusions on that bent over end portion.

Although clip attachment systems for a portable device such as a flashlight are useful in many situations, there are other situations in which it is desirable to secure a flashlight to an object without utilizing a clip as the securement device. In such situations a flashlight may be equipped with an integral securement device specifically for securement to a particular type of object, which securement device is not conveniently removable from the flashlight for permitting the flashlight to be utilized as a hand held light. For example, prior art bicycle lights are generally manufactured as being specifically for mounting to a bicycle, including a mount integral with the light such that the light is not conveniently removable from the bicycle nor practical for use as a hand held flashlight.

One type of flashlight apparatus which does not include a clip but in which a flashlight is securable to an object and may be conveniently removed from the object for hand held use, is disclosed in U.S. patent application Ser. No. 10/133,894, filed Apr. 26, 2002 by Paul Y. Kim and assigned to the assignee of the present invention. The flashlight apparatus taught therein includes a flashlight with a grooved rear cap secured to the flashlight's battery housing, the groove being perpendicular to the cap's longitudinal axis. An interface device includes a first preferably arcuate portion adapted to be removably fitted into the perpendicular preferably annular groove for holding the flashlight, and the interface device includes a second portion adapted to be secured to the object. Another preferably arcuate member may be fitted into the groove for securing the interface device's first portion to the rear cap.

SUMMARY OF THE INVENTION

Against this background, the present invention provides apparatus and methods directed to a flashlight including a battery housing having an undercut groove for facilitating the flashlight's securement to and removal from an interface device which itself is adapted to be removably secured to the object.

According to one aspect of the present invention, there is provided a flashlight apparatus securable to an object, comprising in combination: a flashlight including a battery housing; an undercut groove in the battery housing, the undercut groove having an opening at one end thereof; an interface device adapted to be removably secured to the object and including a head adapted to be removably fitted into the undercut groove through the opening for holding the flashlight; and a component secured to the battery housing in the vicinity of such one end for blocking removal of the head from the undercut groove through the opening when fitted into the undercut groove, the component being removable from the vicinity of such one end for permitting removal of the head from the undercut groove through the opening. The component is removable from the vicinity of such one end for permitting fitting of the head into the undercut groove through the opening. The component is preferably removably secured to the housing, forwardly of such one end of the undercut groove, and the component may comprise a component of the flashlight, preferably a lamp housing of the flashlight. In a preferred embodiment, at least a portion of the undercut groove is closed at the undercut groove's other end (preferably the rearward end) for blocking the head at such other end when the head is fitted into the undercut groove.

The preferred embodiment of the present invention includes an undercut groove having lateral grooves below overhangs; and the head of the interface device includes lateral protrusions fitting into the lateral grooves when the head is fitted into the undercut groove. The lateral grooves are preferably closed at the other end of the undercut groove for blocking the head at such other end when the head is fitted into the undercut groove.

According to a further aspect of the present invention, a method is provided for securing a flashlight to an object, comprising: providing a battery housing for the flashlight including an undercut groove in the battery housing, the undercut groove having an opening at one end thereof; providing a component adapted to be secured to the battery housing in the vicinity of such one end of the undercut groove and to be removed from the vicinity of such one end; providing an interface device adapted to be removably secured to the object and including a head adapted to be removably fitted into the undercut groove through the opening for holding the flashlight; placing the flashlight to the interface device with the head fitted into the undercut groove through the opening; and securing the component to the battery housing in the vicinity of the one head of the undercut groove for blocking removal of the head through the opening.

Preferably at least a portion of the undercut groove is closed at another end of the undercut groove; and during the flashlight placing step, the head is blocked at the other end by such portion of the undercut groove when the head is fitted into the undercut groove. The undercut groove preferably includes lateral grooves under overhangs, the head of the interface device includes lateral protrusions for being fitted into the lateral grooves; and during the flashlight placing step, the lateral projections are fitted into the lateral grooves. The lateral grooves are preferably closed at another end of the undercut groove; and during the flashlight placing step, the head is blocked at such other end.

The method includes removably securing the interface device to the object (for example, to a bicycle or to a binocular), which step may be performed either before or after the flashlight is removably secured to the interface device.

BRIEF DESCRIPTION OF THE DRAWINGS

The novel features believed to be characteristic of the invention, together with further advantages thereof, will be better understood from the following description considered in connection with the accompanying drawings in which preferred embodiments of the present invention are illustrated by way of example. It is to be expressly understood, however, that the drawings are for the purpose of illustration and description only and are not intended as a definition of the limits of the invention.

FIG. 1 is a perspective view of a portable device in the form of a flashlight with a clip for attachment thereof to an object, such as a piece of clothing, according to the aforementioned parent application Ser. No. 09/606,605;

FIG. 2 is a fragment of a section taken on the line 2—2 in FIG. 1 and enlarged;

FIG. 8 is a fragmentary cross-section of the flashlight battery housing of FIG. 7, showing the undercut groove, taken along the line 8—8 of FIG. 7 in the direction of the appended arrows;

FIG. 9 is a top plan view of a portion of the interface device of FIG. 7, showing the head for being removably fitted into the undercut groove of FIGS. 7 and 8;

FIG. 10 is a front elevation view of the interface device portion of FIG. 9;

FIG. 11 is a side elevation view of the interface device portion of FIGS. 9 and 10;

FIG. 12 is a side elevation view of the assembled flashlight apparatus of FIG. 7, shown attached to a cylindrical object such as a bicycle handlebar;

FIG. 13 is a fragmentary cross-section of the assembled flashlight apparatus of FIG. 12, taken along the line 13—13 of FIG. 12 in the direction of the appended arrows;

FIG. 14 is a side elevation view, partly in cross-section, of a second preferred embodiment of the flashlight apparatus according to the present invention, representing a flashlight secured to an interface device which is secured to a binocular; and FIG. 15 is a front elevation view of the interface device of FIG. 14.

DESCRIPTION OF THE PREFERRED EMBODIMENTS

Figure 3:
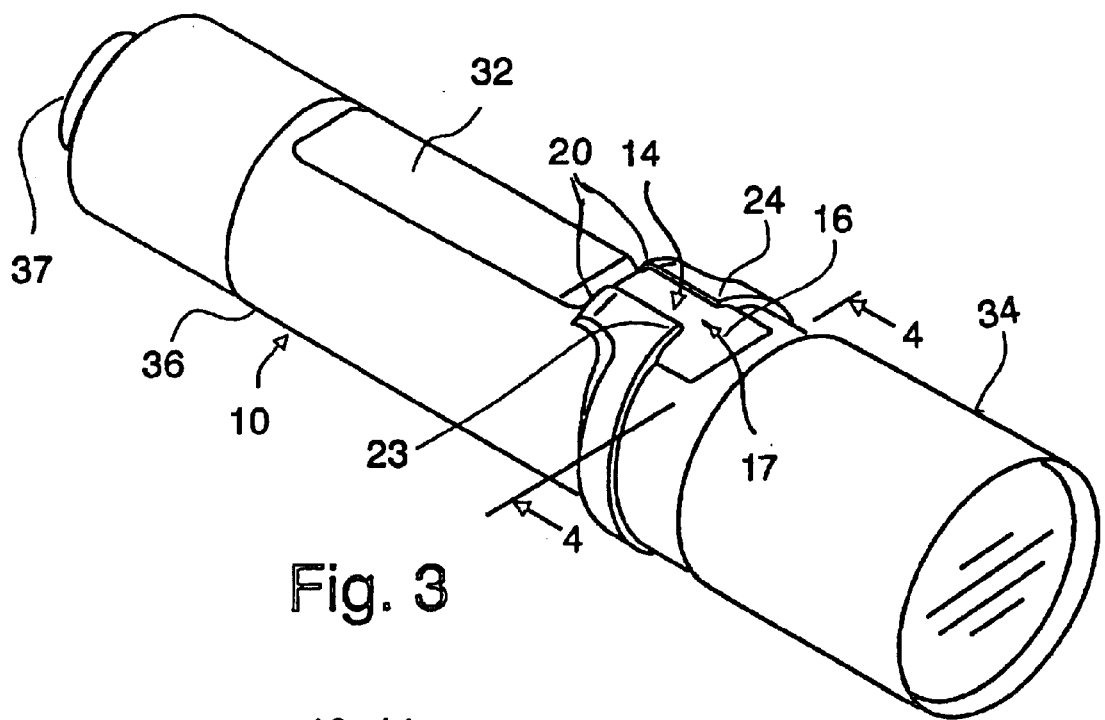
FIG. 3 is a view similar to FIG. 1 with clip and piece of clothing removed.

FIGS. 1–6 of the drawings are illustrative of a flashlight 10 or other device equipped with a clip 12 for attachment of such device to a fragmentally illustrated piece of clothing, belt or other object 13, and of method of equipping such portable device with a clip for attachment thereof to an object, as disclosed in the aforesaid parent application Ser. No. 09/606,605. Within the scope of the invention, the expression "attachment" in the preceding sentence is intended to be sufficiently broad to cover a holstering of the clip 12 in a holstering device therefor, such as in the type of support bracket shown at 30 in Valenti U.S. Pat. No. 5,630,535 which is hereby incorporated by reference herein.

According to a preferred embodiment, such portable device 10, comprises a combination of an undercut groove 14 and a clip 12, herein sometimes referred to as "device attachment clip," having a head 15 fit into that undercut groove.

By way of example, the illustrated embodiment provides the portable device 10 with an undercut groove 14 and the clip 12 with a head 15 fitting into that undercut groove, and attaches that clip to that portable device by fitting such head of the clip into the undercut groove of the portable device.

The device 10 may be provided with a flat or other sliding surface 16 for the head 15 of the clip 12 extending into the undercut groove 14 through an opening 17 at one end of the undercut groove 14. The head of the clip may be press-fit into such undercut groove.

The head 15 of the clip is preferably held in the undercut groove 14 by spring action. There may be a resilient mount of the head 15 of the clip in the undercut groove 14, such as more fully disclosed below.

Figure 6:
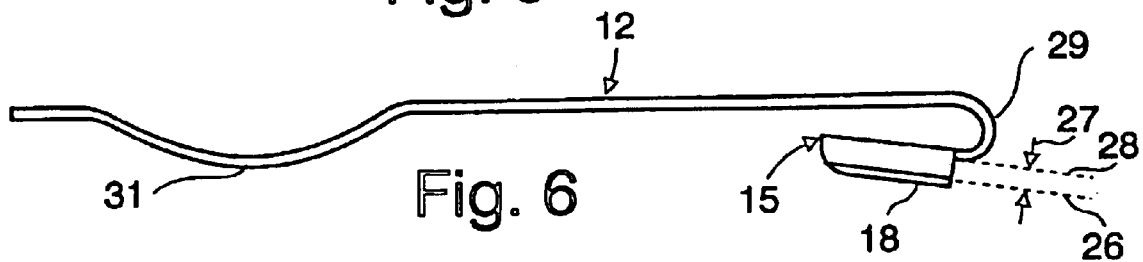
FIG. 6 is a side view of the clip shown in FIG. 1 and in FIG. 5 on an enlarged scale, and ready for insertion into an undercut groove in the portable device, such as in FIG. 3, for completion of the assembly, such as seen in FIG. 1.

Pursuant to an embodiment of the invention, the head 15 of the clip 12 is provided with or has lateral protrusions 18 and 19 fitting into lateral grooves 21 and 22 below overhangs 23 and 24 of the undercut groove 14, such as seen in FIG. 2 with the aid of FIG. 4. As seen in FIGS. 2 and 6, the lateral protrusions 18 and 19 preferably are offset so as to be in a plane 26 spaced, such as by a distance or as seen at 27 from a plane 28 through an adjacent portion of the clip.

Provision of the head 15 of the clip 12 includes bending over a portion of that clip. There thus is a bent over portion or bight portion 29 of the clip at the head of that clip. Pursuant to a preferred embodiment of the invention, an end portion of the clip is bent over so that such portion converges toward an adjacent portion of that clip, such as seen in FIG. 6 which shows the bent over end portion of the clip converging toward an adjacent portion of that clip at the head of that clip.

In practice, this spring-biases the clip head in the undercut groove 14 or under its overhangs 23 and 24. For a realization of such resilient mount of the clip 12, such clip may be placed on the device 10 with the clip head 15 on the outer portion of the flat or other sliding surface 16. The clip is then depressed such as midway between its opposite ends until the head 15 can slide through the opening 17 into the undercut groove 14 as the clip is moved in that direction. At least a portion of the undercut groove 14 may be closed at its other end, such as the closed ends 20 of the lateral grooves 21 and 22 opposite the opening 17 as seen in FIG. 3, preventing the head 15 from exiting the undercut groove 14 during such movement. When the clip is thereupon released, the resiliency of the clip strongly holds its head 15 in the undercut groove below overhangs 23 and 24.

The different features so far disclosed may be used alternatively or in combination.

Accordingly, an end portion of the clip 12 is provided with lateral protrusions 18 and 19 fitting into lateral grooves 21 and 22 below overhangs 23 and 24 of the undercut groove 14 and is bent over toward a remainder of that clip for formation of the head 15 of the clip. In apparatus terms, lateral protrusions 18 and 19 at an end portion of the clip fit into lateral grooves 21 and 22 below overhangs 23 and 24 of the undercut groove 14, and such end portion is bent over toward a remainder of that clip 12 at the head of that clip. In such combination, the mentioned end portion of the clip may be bent over so as to converge toward a remainder of the clip for formation of the head of the clip, such as shown in FIG. 6. The lateral protrusions 18 and 19 again may be offset so as to be in a plane 26 spaced from a plane 28 through the end portion of the clip, such as by a distance or as seen at 27.

The clip 12 may have or be shaped with a projecting portion 31 for engaging the object 13 in conjunction with the portable device 10. According to an embodiment of the invention, this may be combined with the above mentioned bending over of an end portion of the clip, or inclusion of a bent over end portion of that clip, preferably in convergence to an adjacent portion of the clip, such as seen in FIG. 6 at 15 and 29.

FIGS. 1 and 3 show presence or formation of a flat 32 formed on the portable device 10 adjacent the projecting portion 31 of the clip best seen in FIG. 6. In practice, this helps engagement of the object 13 by the clip 12 and device 10.

The portable device 10 may have or be provided with a removable component 34 at the undercut groove 14. The head of the clip may be releasably retained in that undercut groove with that removable component of the portable device. An embodiment of the invention thus may have an attachment clip retainer including a removable component 34 of the portable device 10 at the head 15 of the clip 12. In practice, this helps accidental dislodgment of the clip from the portable device 10. On the other hand, because of the presence of such attachment clip retainer, the head of the clip may be releasably retained in the undercut groove for manual removal of the clip 12 from the portable device 10, such as after a temporary removal of the component 34 from the remainder of the device 10. Accordingly, such portable device may be manually equipped with a clip 12 when desired, but may be used without such clip whenever that is preferred by the user.

The portable device may be or may be shaped as a flashlight having the undercut groove 14, such as seen in FIGS. 1 to 4. In that case such flashlight may have or may be equipped with a lamp housing being the above mentioned component 34 and extending to the vicinity of the undercut groove 14. In this manner, the head 15 of the clip may be retained in that undercut groove with the aid of such lamp housing, such as seen in FIG. 1 which shows the lamp housing 34 secured to the flashlight's battery housing 36 at the installed clip's bent over portion 29, blocking removal of the head 15 from the undercut groove 14 through the opening 17. When the clip is not installed, the removable lamp housing 34 may be secured to the battery housing 36 in the vicinity of the undercut groove's opening 17, as shown in FIG. 3.

In principle, the flashlight may be of a conventional type, having a barrel or housing 36 for containing batteries for energizing an electric light source in the lamp housing at 34, such as via a tailend switch 37 or other ON/OFF switching device.

A clip 12 for attachment of a flashlight 10 or other portable device to an object 13 comprises a combination of a bent over end portion 29 and lateral protrusions 18 and 19 on that bent over portion. Such lateral protrusions preferably are offset so as to be in a plane 26 spaced from a plane 28 through an adjacent portion of that clip, such as seen at 27. Such bent over end portion 29 of the clip 12 again preferably converges toward an adjacent portion of the clip, such as seen in FIG. 6 at 15 and 29.

The clip 12 may have an object-engaging projection 31 at an end region of that clip opposite the bent over end portion 29 such as explained above with reference to FIGS. 1, 5 and 6.

Turning to FIGS. 7–13, there is shown a flashlight securement apparatus including a flashlight 110 removably securable to an object, for example a bicycle handlebar 40 shown in cross-section in FIG. 12, through an included interface device 42. Similarly to the flashlight 10 of FIG. 3, the flashlight 110 includes a battery housing 136 having an undercut groove 14 with an opening 17 at one end of the undercut groove 14, preferably the undercut groove's forward end 44 directed toward the front or lamp housing 134 of the flashlight 110. The undercut groove 14 is preferably parallel to the longitudinal axis a of the battery housing 136. At least a portion of the preferred embodiment of the undercut groove 14 is closed at the undercut groove's other end 46, such as the closed ends 20 of the lateral grooves 21 and 22 which are included by the undercut groove 14.

Figure 4:
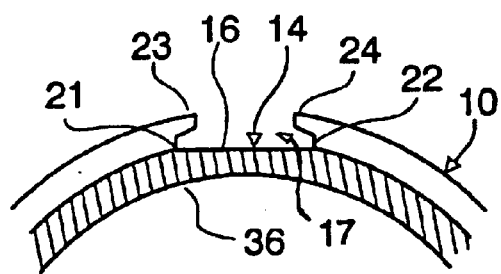
FIG. 4 is a fragment of a section taken on the line 4—4 in FIG. 3 and enlarged.
Figure 5:
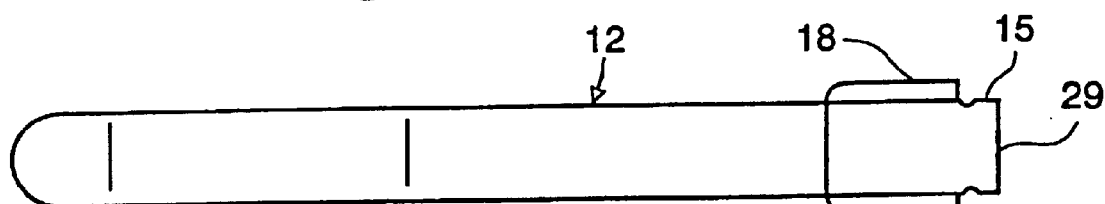
FIG. 5 is a bottom view on an enlarged scale of the clip shown in FIG. 1.

The lateral grooves 21, 22, as seen in FIG. 4, are beneath respective overhangs 23, 24 of the undercut groove 14. The battery housing 136 in FIG. 8 is effectively the battery housing 36 of FIG. 4 shown upside down; the undercut groove 14 in FIG. 8 is shown downwardly disposed so that the "overhangs" 23, 24 appear below the lateral grooves 21, 22. Nevertheless, for consistency in describing the structure of the undercut groove 14 in both FIGS. 4 and 8 and elsewhere in the drawings, in the terminology used herein to items 23 and 24 are referred to as "overhangs". Accordingly, in FIG. 8 the lateral grooves 21 and 22 are considered herein as being below the overhangs 22 and 23, respectively.

The lateral grooves 21, 22 respectively extend along opposite sides of the undercut groove surface 116 which is preferably flat similarly to the flat surface 16 shown in FIG. 4. The lateral grooves 21, 22 are open at the undercut groove's open end 44 and are closed at the undercut groove's other end 46 such as at the closed ends 20 of the lateral grooves 21 and 22 as seen in FIGS. 3 and 7.

The interface device 42 includes a clamp or other securement mechanism for removably securing the interface device 42 to an object 40. In the preferred embodiment shown in FIGS. 7 and 12, the interface device 42 includes a clamping device 52 for being clamped to a cylindrical or tubular object 40 such as the handlebar of a bicycle. The clamping device 52 includes a resilient C-clamp 54, fabricated of a resilient polymeric material such as marketed under the trademark WELLAMID by Wellman Inc., or another resilient or flexible material such as nylon. The ends of the C-clamp 54 each include an aperture 56, the apertures 56 being aligned for receiving a bolt 58 having a flange 60 at one end, the clamp 52 including a nut 64 for engaging threads 61 along the bolt 58 in the vicinity of the bolt's other end. The ends of the C-clamp 54 may be urged apart to admit the cylindrical object 40 fitting in the C of the C-clamp 54, whereupon the bolt 58 is inserted through the apertures 56 and the nut 64 is caused to be threadably engaged with the threads of the bolt 56. Tightening of the nut 64 on the bolt 58 with the bolt flange 60 and nut 64 straddling the C-clamp 54 and in contact engagement with the ends thereof, cause the C-clamp 54 to be clamped upon the cylindrical object 40 and to be secured thereto. Reversal of such securing procedure permits the clamping device 52 to be removed from the object 40.

Figure 7:
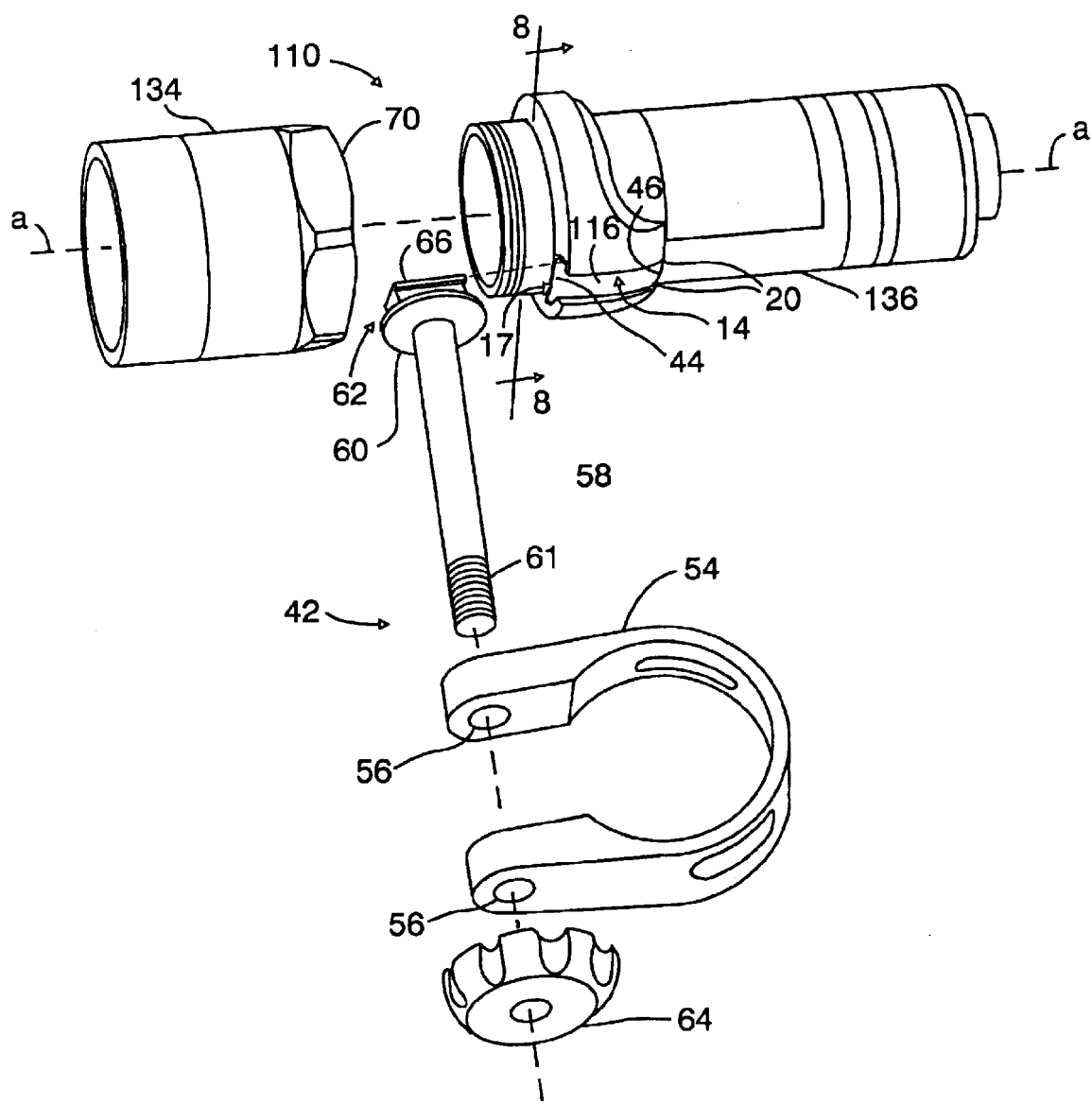
FIG. 7 is an exploded perspective view of a preferred embodiment of a flashlight apparatus securable to an object, according to the present invention, showing a flashlight securable to an interface device which is securable to an object.

The interface device 42 includes a head 62 which in the preferred embodiment of FIG. 7 is secured to the flange 60 and is preferably unitary therewith. The head 62 is configured to be fitted into the undercut groove 14 in the flashlight housing 136, for holding the flashlight 110. The head 62 includes lateral protrusions 66 dimensioned and longitudinally extending for being fitted into the lateral grooves 21, 22 through the opening 17 at the preferably forward end 44 of the undercut groove 14 (see FIG. 7). The width of the neck portion 68 of the head 62, under the lateral protrusions 66 (see FIG. 10), is less than the lateral separation of the overhangs 23, 24 for permitting the head 62 to be slidingly inserted through the opening 17 into the undercut groove 14, and the lateral protrusions 66 into the lateral grooves 21, 22. The closed ends 20 of the lateral grooves 21, 22 at the undercut groove's rearward end 46 block the lateral protrusions 66 and hence the head 62 from being removed from the undercut groove 14 through the undercut groove's rearward end 46.

The invention includes a component which is secured to the battery housing 136 in the vicinity of the undercut groove's open end 44 for blocking removal of the head 62 from the undercut groove 14 through the opening 17 when the head 62 is fitted into the undercut groove 14. This component also is removable from the vicinity of the open end 44 for permitting removal of the head 62 from the undercut groove 14 through the opening 17 as well as for permitting fitting of the head 62 into the undercut groove 14 through the opening 17. In the preferred embodiment, the component is secured to the housing 136 and is entirely removable from the housing 136. As shown in the preferred embodiment of FIGS. 7 and 12, such component comprises a component of the flashlight 110 and is preferably the lamp housing 134 of the flashlight 110. When the lamp housing 134 is threadably secured to the flashlight's battery housing 136 forwardly of the undercut groove's open end 44, the rear annular edge 70 of the lamp housing 134 blocks the fitted head 62 from being removed from the undercut groove 14 through the opening 17. The lamp housing rear edge 70 may be placed into contact with the flange 60 or the head 62, in which event the rear edges of the lateral protrusions 66 may be pressed against the closed ends 20 of the lateral grooves 21, 22, for more firmly securing the head 62 of the interface device 42 to the housing 136 of the flashlight 110. The head 62 may be removed from the undercut groove 14 longitudinally through the opening 17 following removal of the lamp housing 134 from the battery housing 136, when desired.

A second preferred embodiment of the present invention, depicted in FIGS. 14 and 15, comprises the flashlight 110 secured to a binocular 72 through the interface device 142. The binocular 72 is of a type which includes, or is adapted to include, a forwardly directed protuberance 74 situated on the binocular housing, preferably on the hinge between the binocular's telescopes. Such binoculars are conventional and well known, as is the protuberance 74 situated as described, which protuberance 74 is conventionally used for securing the binocular to a tripod.

A preferred configuration of the interface device 142 includes a generally cylindrical member 76 having a blind longitudinal bore 78 at one end for fittingly receiving the protuberance 74 of the binocular 72. A lateral slit 80 longitudinally extends from the interior of the interface device to the bore 78. A thumbscrew 82 extends through a bore 84 in the member 76 perpendicular to the slit 80 and is threadably engaged with the portion of the bore 84 below the slit 80 as viewed in the drawing of FIG. 14. Tightening of the thumbscrew 82 causes a decrease in the slit separation (i.e. in the height of the slit 80 as viewed in FIG. 14), thereby urging the walls of the bore 78 to grasp the protuberance 74 and to thereby secure the interface device 142 to the binocular 72.

The member 76 of the interface device 142 includes a right angle bend, terminating with the head 62 which is removably fitted into the undercut groove 14 of the flashlight housing 110 as described above in connection with FIGS. 7–13.

Thus, there have been described preferred embodiments of flashlight apparatus removably securable to an object such as a bicycle and a binocular, as well as methods for effecting such securement. Other embodiments of the present invention, and variations of the embodiments described herein, may be developed without departing from the essential characteristics thereof. Accordingly, the invention should be limited only by the scope of the claims listed below.

I claim:
1. Flashlight apparatus securable to an object, comprising in combination:
   a flashlight including a battery housing and a lamp housing;
   an undercut groove in said battery housing, said undercut groove having an opening at one end thereof;
   an interface device adapted to be removably secured to the object and including a head adapted to be removably fitted into said undercut groove through said opening for holding said flashlight; and
   said lamp housing secured to said battery housing in the vicinity of said one end for blocking removal of said head from said undercut groove through said opening when fitted into said undercut groove, said lamp housing being removable from the vicinity of said one end for permitting removal of said head from said undercut groove through said opening.

2. The apparatus according to claim 1, wherein:
   said lamp housing is removable from the vicinity of said one end for permitting fitting of said head into said undercut groove through said opening.

3. The apparatus according to claim 1, wherein:
   said lamp housing is removably secured to said housing.

4. The apparatus according to claim 1, wherein:
   said lamp housing is removably secured to said housing forwardly of said one end of said undercut groove.

5. Flashlight apparatus securable to an object, comprising in combination:
   a flashlight including a battery housing;
   an undercut groove in said battery housing, said undercut groove having an opening at one end thereof;
   an interface device including a clamp removably securable to the object and including a head adapted to be removably fitted into said undercut groove through said opening for holding said flashlight; and
   a component secured to said battery housing in the vicinity of said one end for blocking removal of said head from said undercut groove through said opening when fitted into said undercut groove, said component being removable from the vicinity of said one end for permitting removal of said head from said undercut groove through said opening.

6. Flashlight apparatus securable to a bicycle, comprising in combination:
a flashlight including a battery housing;
an undercut groove in said battery housing, said undercut groove having an opening at one end thereof;
an interface device adapted to be removably secured to the bicycle and including a head adapted to be removably fitted into said undercut groove through said opening for holding said flashlight; and
a component secured to said battery housing in the vicinity of said one end for blocking removal of said head from said undercut groove through said opening when fitted into said undercut groove, said component being removable from the vicinity of said one end for permitting removal of said head from said undercut groove through said opening.

7. Flashlight apparatus securable to a binocular, comprising in combination:
a flashlight including a battery housing;
an undercut groove in said battery housing, said undercut groove having an opening at one end thereof;
an interface device adapted to be removably secured to the binocular and including a head adapted to be removably fitted into said undercut groove through said opening for holding said flashlight; and
a component secured to said battery housing in the vicinity of said one end for blocking removal of said head from said undercut groove through said opening when fitted into said undercut groove, said component being removable from the vicinity of said one end for permitting removal of said head from said undercut groove through said opening.

8. Flashlight apparatus securable to an object, comprising in combination:
a flashlight including a battery housing;
an undercut groove in said battery housing, said undercut groove having an opening at one end thereof;
an interface device adapted to be removably secured to the object and including a head adapted to be removably fitted into said undercut groove through said opening for holding said flashlight;
a component secured to said battery housing in the vicinity of said one end for blocking removal of said head from said undercut groove through said opening when fitted into said undercut groove, said component being removable from the vicinity of said one end for permitting removal of said head from said undercut groove through said opening; and
at least a portion of said undercut groove is closed at another end of said undercut groove for blocking said head at said other end when said head is fitted into said undercut groove.

9. The apparatus according to claim 8, wherein:
said component is removable from the vicinity of said one end for permitting fitting of said head into said undercut groove through said opening.

10. The apparatus according to claim 8, wherein:
said component is removably secured to said housing.

11. The apparatus according to claim 8, wherein:
said component comprises a component of said flashlight.

12. The apparatus according to claim 8, wherein:
said component is removably secured to said housing forwardly of said one end of said undercut groove.

13. The apparatus according to claim 8, wherein:
said component comprises a lamp housing of said flashlight.

14. The apparatus according to claim 8, wherein:
said second portion includes a clamp removably securable to the object.

15. The apparatus according to claim 8, wherein the object comprises a bicycle.

16. The apparatus according to claim 8, wherein the object comprises a binocular.

17. Flashlight apparatus securable to an object, comprising in combination:
a flashlight including a battery housing;
an undercut groove in said battery housing, said undercut groove having an opening at one end thereof, said undercut groove including lateral grooves below overhangs;
an interface device adapted to be removably secured to the object and including a head adapted to be removably fitted into said undercut groove through said opening for holding said flashlight, said head of said interface device including lateral protrusions fitted into said lateral grooves when said head is fitted into said undercut groove; and
a component secured to said battery housing in the vicinity of said one end for blocking removal of said head from said undercut groove through said opening when fitted into said undercut groove, said component being removable from the vicinity of said one end for permitting removal of said head from said undercut groove through said opening.

18. The apparatus according to claim 17, wherein
said lateral grooves are closed at another end of said undercut groove for blocking said lateral protrusions at said other end when said head is fitted into said undercut groove.

19. Flashlight apparatus securable to an object, comprising in combination:
a flashlight including a battery housing and a lamp housing;
an undercut groove in said battery housing, said undercut groove having an opening at one end thereof;
an interface device adapted to be removably securable to the object and including a head removably fitted into said undercut groove through said opening; and
said lamp housing secured to said battery housing in the vicinity of said one end and blocking removal of said head from said undercut groove through said opening, said lamp housing being removable from the vicinity of said one end for permitting said head to be removed from said undercut groove through said opening and for permitting said head when removed to be fitted into said undercut groove through said opening.

20. The apparatus according to claim 19, wherein:
said lamp housing is removably secured to said housing.

21. The apparatus according to claim 19, wherein:
said lamp housing is removably secured to said housing forwardly of said one end of said undercut groove.

22. Flashlight apparatus securable to an object, comprising in combination:
a flashlight including a battery housing;
an undercut groove in said battery housing; said undercut groove having an opening at one end thereof;
an interface device including a clamp removably securable to the object and including a head removably fitted into said undercut groove through said opening; and a component secured to said battery housing in the vicinity of said one end and blocking removal of said head from said undercut groove through said opening, said component being removable from the vicinity of said one end for permitting said head to be removed from said undercut groove through said opening and for permitting said head when removed to be fitted into said undercut groove through said opening.

23. Flashlight apparatus securable to a bicycle, comprising in combination:

a flashlight including a battery housing;

an undercut groove in said battery housing, said undercut groove having an opening at one end thereof;

an interface device adapted to be removably securable to the bicycle and including a head removably fitted into said undercut groove through said opening; and a component secured to said battery housing in the vicinity of said one end and blocking removal of said head from said undercut groove through said opening, said component being removable from the vicinity of said one end for permitting said head to be removed from said undercut groove through said opening and for permitting said head when removed to be fitted into said undercut groove through said opening.

24. Flashlight apparatus securable to a binocular, comprising in combination:

a flashlight including a battery housing;

an undercut groove in said battery housing, said undercut groove having an opening at one end thereof;

an interface device adapted to be removably securable to the binocular and including a head removably fitted into said undercut groove through said opening; and a component secured to said battery housing in the vicinity of said one end and blocking removal of said head from said undercut groove through said opening, said component being removable from the vicinity of said one end for permitting said head to be removed from said undercut groove through said opening and for permitting said head when removed to be fitted into said undercut groove through said opening.

25. In a method of securing a flashlight to an object, the steps comprising:

providing a battery housing for the flashlight including an undercut groove in said battery housing, said undercut groove having an opening at one end thereof;

providing a lamp housing for said flashlight adapted to be secured to said battery housing in the vicinity of said one end of said undercut groove and to be removed from the vicinity of said one end;

providing an interface device adapted to be removably secured to the object and including a head adapted to be removably fitted into said undercut groove through said opening for holding said flashlight;

placing said flashlight to said interface device with said head fitted into said undercut groove through said opening; and securing said lamp housing to said battery housing in the vicinity of said one end of said undercut groove for blocking removal of said head through said opening.

26. The method according to claim 25, further including:

securing said interface device to the object.

27. In a method of securing a flashlight to a bicycle, the steps comprising:

providing a battery housing for the flashlight including an undercut groove in said battery housing, said undercut groove having an opening at one end thereof;

providing a component adapted to be secured to said battery housing in the vicinity of said one end of said undercut groove and to be removed from the vicinity of said one end;

providing an interface device adapted to be removably secured to the bicycle and including a head adapted to be removably fitted into said undercut groove through said opening for holding said flashlight;

placing said flashlight to said interface device with said head fitted into said undercut groove through said opening; and securing said component to said battery housing in the vicinity of said one end of said undercut groove for blocking removal of said head through said opening.

28. In a method of securing a flashlight to a binocular, the steps comprising:

providing a battery housing for the flashlight including an undercut groove in said battery housing, said undercut groove having an opening at one end thereof;

providing a component adapted to be secured to said battery housing in the vicinity of said one end of said undercut groove and to be removed from the vicinity of said one end;

providing an interface device adapted to be removably secured to the binocular and including a head adapted to be removably fitted into said undercut groove through said opening for holding said flashlight;

placing said flashlight to said interface device with said head fitted into said undercut groove through said opening; and securing said component to said battery housing in the vicinity of said one end of said undercut groove for blocking removal of said head through said opening.

29. In a method of securing a flashlight to an object, the steps comprising:

providing a battery housing for the flashlight including an undercut groove in said battery housing, said undercut groove having an opening at one end thereof and at least a portion of said undercut groove is closed at another end of said undercut groove;

providing a component adapted to be secured to said battery housing in the vicinity of said one end of said undercut groove and to be removed from the vicinity of said one end;

providing an interface device adapted to be removably secured to the binocular and including a head adapted to be removably fitted into said undercut groove through said opening for holding said flashlight;

placing said flashlight to said interface device with said head fitted into said undercut groove through said opening and said head blocked at said other end by said portion of said undercut groove; and securing said component to said battery housing in the vicinity of said one end of said undercut groove for blocking removal of said head through said opening.

30. The method according to claim 29, wherein:

during the component securing step, said component is secured to said housing forwardly of said one end of said undercut groove.

31. The method according to claim 29, wherein:

said component comprises a component of said flashlight.

32. The method according to claim 29, wherein:

said component comprises a lamp housing of said flashlight.

33. In a method of securing a flashlight to an object, the steps comprising:

providing a battery housing for the flashlight including an undercut groove in said battery housing, said undercut groove having an opening at one end thereof, said undercut groove including lateral grooves under overhangs;

providing a component adapted to be secured to said battery housing in the vicinity of said one end of said undercut groove and to be removed from the vicinity of said one end;

providing an interface device adapted to be removably secured to the object and including a head adapted to be removably fitted into said undercut groove through said opening for holding said flashlight, said head of said interface device including lateral protrusions for being fitted into said lateral grooves;

placing said flashlight to said interface device with said head fitted into said undercut groove through said opening and said lateral protrusions fitted into said lateral grooves; and securing said component to said battery housing in the vicinity of said one end of said undercut groove for blocking removal of said head through said opening.

34. The method according to claim 33, wherein:

said lateral grooves are closed at another end of said undercut groove; and during the flashlight placing step, said head is blocked at said other end.

35. The method according to claim 34, wherein:

during the component securement step, said component is secured to said housing forwardly of said one end of said undercut groove.

36. The method according to claim 34, wherein:

said component comprises a lamp housing of said flashlight.

* * * * *